United States Patent [19]

Okuyama et al.

[11] Patent Number: 4,733,315
[45] Date of Patent: Mar. 22, 1988

[54] FEEDING DEVICE FOR A MAGNETIC HEAD

[75] Inventors: Takeshi Okuyama; Yoshitaka Araki, both of Tokyo, Japan

[73] Assignee: Nippon Kogaku K. K., Tokyo, Japan

[21] Appl. No.: 782,105

[22] Filed: Sep. 30, 1985

[30] Foreign Application Priority Data

Oct. 9, 1984 [JP] Japan ................................ 59-212241

[51] Int. Cl.$^4$ ............................................. G11B 5/55
[52] U.S. Cl. .................................................... 360/106
[58] Field of Search ............. 360/105, 106, 109, 97–99

[56] References Cited

U.S. PATENT DOCUMENTS

| 3,314,057 | 4/1967 | Mogtader | 360/106 |
| 4,595,963 | 6/1986 | Shimaoka | 360/106 |

FOREIGN PATENT DOCUMENTS

| 155999 | 10/1985 | European Pat. Off. | 360/106 |
| 140303 | 2/1980 | Fed. Rep. of Germany | 360/109 |
| 58-205959 | 12/1983 | Japan | 360/109 |
| 60-93684 | 5/1985 | Japan | 360/109 |
| 548888 | 4/1977 | U.S.S.R. | 360/106 |

Primary Examiner—John H. Wolff
Assistant Examiner—Matthew J. Bussan
Attorney, Agent, or Firm—Shapiro and Shapiro

[57] ABSTRACT

An apparatus for recording information on concentric circular recording tracks on a rotatable magnetic recording medium and/or reproducing the information from the recording tracks comprises a magnetic head provided in opposed relationship with the recording medium, a rotatable member, a driving device for intermittently rotating the rotatable member by a predetermined angle, a lever having a pivot shaft and intermittently pivoting in a predetermined direction about the pivot shaft by a unit pivot angle corresponding to the predetermined angle in response to the rotatable member, and a mechanism for intermittently moving the magnetic head in one direction on a straight line passing through the center of rotation of the recording medium in response to the pivoting lever, the head moving mechanism converting the pivotal displacement of the pivoting lever into rectilinear displacement.

15 Claims, 7 Drawing Figures a --- $R3 = Y0/\theta 0$
b --- $Y0/\theta 0 < R3 < i \cdot Y0/\sin(i \cdot \theta 0)$
c --- $R3 = i \cdot Y0/\sin(i \cdot \theta 0)$
d --- $R3 > i \cdot Y0 \cdot \sin(i \cdot \theta 0)$

FEEDING DEVICE FOR A MAGNETIC HEAD

BACKGROUND OF THE INVENTION

1. Field of the Invention

This invention relates to a feeding device for a magnetic head used in a magnetic recording-reproducing apparatus for recording still image information or the like so as to form a plurality of recording tracks in the form of concentric circles on a magnetic recording disc and/or reproducing the information recorded on the recording tracks.

2. Description of the Prior Art

In a magnetic recording-reproducing apparatus for recording information so as to form recording tracks in the form of concentric circles on a magnetic recording disc and/or reproducing the recorded signals of the recorded information from the recording tracks, a head feeding mechanism is provided for shifting a magnetic head to the next track to record or reproduce the next information after information has been recorded on a track or information has been reproduced from a track. In recent years, a so-called electronic still camera in which the magnetic recording apparatus is made compact and combined with a photographing apparatus to record still images and its reproducing apparatus have been announced and are already known.

To manufacture such type of magnetic recording-reproducing apparatus, it is necessary to keep compactness for ease of use and at the same time, keep interchangeability between products so that even if recording discs are interchangeably used in a plurality of products, recording and reproducing can be accomplished without hindrance and the performance is not reduced. Of the interchangeability between products, it is a particularly important task to reduce the positional deviation of the magnetic head during reproduction relative to the recording tracks and further reduce the deviation of the azimuth angle of the magnetic head during recording and during reproduction to thereby minimize the reduction in the reproduction output.

Therefore, a method of intermittently moving the magnetic head at an equal interval pitch on a radial straight line passing through the center of rotation of the disc so as to record information so that concentric circular recording tracks are regularly arranged and so as to reproduce the information in accordance therewith is suitable for such type of apparatus. On the other hand, in a product such as an electronic still camera, the magnetic disc used must be compact and moreover capable of recording a great deal of image information and the magnetic recording apparatus corresponding thereto also must indispensably be compact and light in weight as well as capable of recording image signals at a high density and satisfying the aforementioned interchangeability between products.

Accordingly, the feeding device for the magnetic head incorporated in such type of apparatus is required to at least satisfy two conditions, namely, the condition that the mechanism thereof shall be compact and the condition that it shall have high positioning accuracy. However, the feeding device according to the prior art has required high working accuracy or has been complicated in structure to satisfy the above-mentioned conditions and actually has not been of a construction suitable for manufacture from the viewpoint of cost of manufacture.

SUMMARY OF THE INVENTION

It is an object of the present invention to solve the above-noted task and to provide a feeding device for a magnetic head which keeps high accuracy and interchangeability.

To achieve the above object, the device according to the present invention is characterized by feeding means for intermittently rotating a rotatable member by a predetermined angle, pivotal means intermittently pivotally displaceable by a predetermined angle in response to the rotation of said rotatable member, and guide means for converting the rotative displacement of said pivotal means into a rectilinear movement and rectilinearly moving the magnetic head radially of recording tracks, whereby the magnetic head is rectilinearly displaced at an approximately equal interval by said pivotal means.

DESCRIPTION OF THE PREFERRED EMBODIMENT

Figure 1:
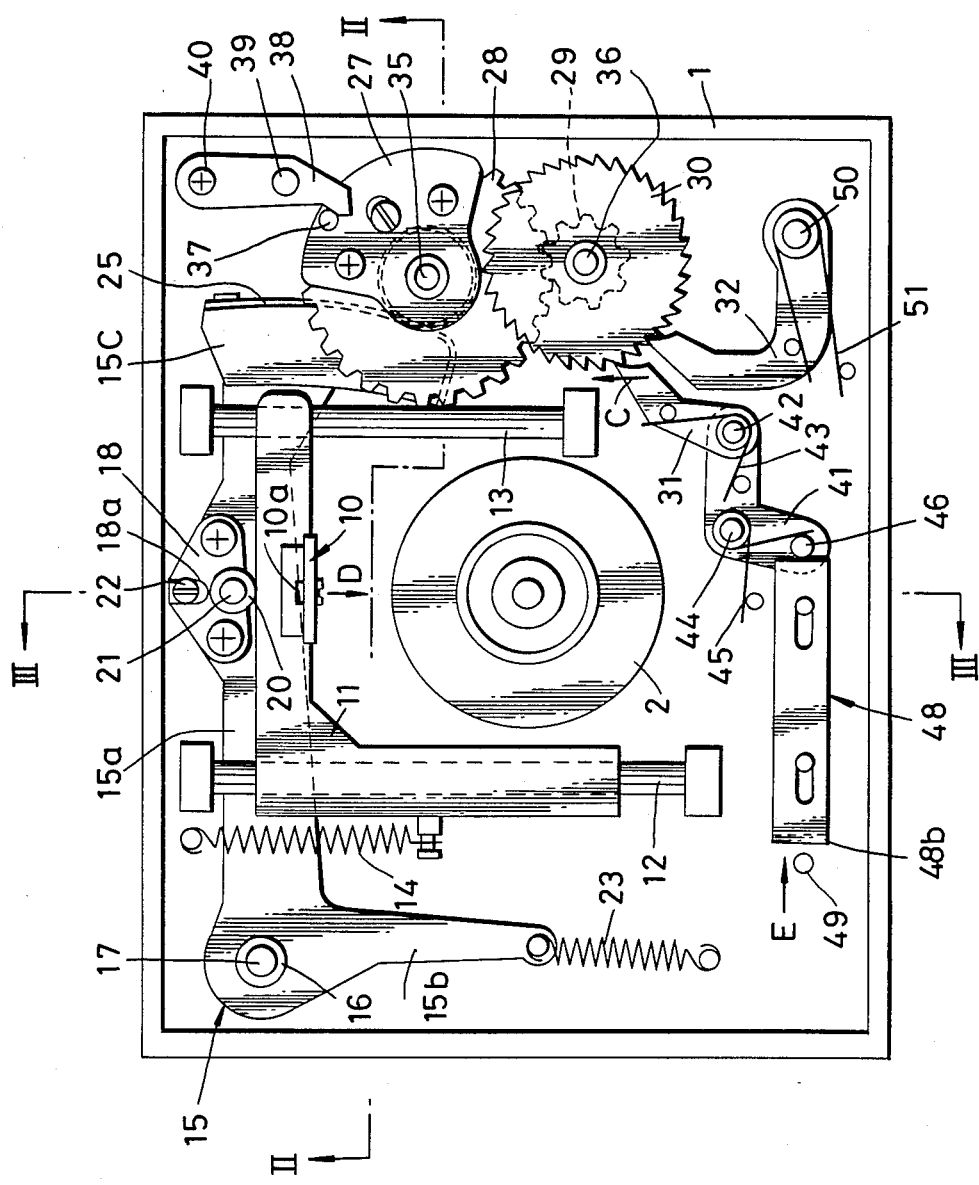
FIG. 1 is a plan view showing an embodiment of the present invention with a recording disc, a jacket and an upper cover being removed.

FIG. 1 shows a magnetic recording apparatus according to an embodiment of the present invention. In FIG. 1, the apparatus is depicted with the jacket of a magnetic recording disc and the cover being removed.

Figure 2:
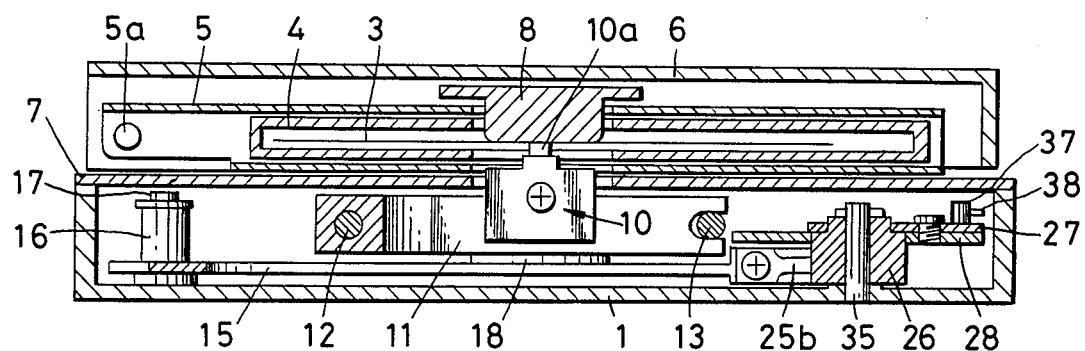
FIG. 2 is a cross-sectional view taken along line II—II of FIG. 1 with the recording disc being mounted in place.
Figure 3:
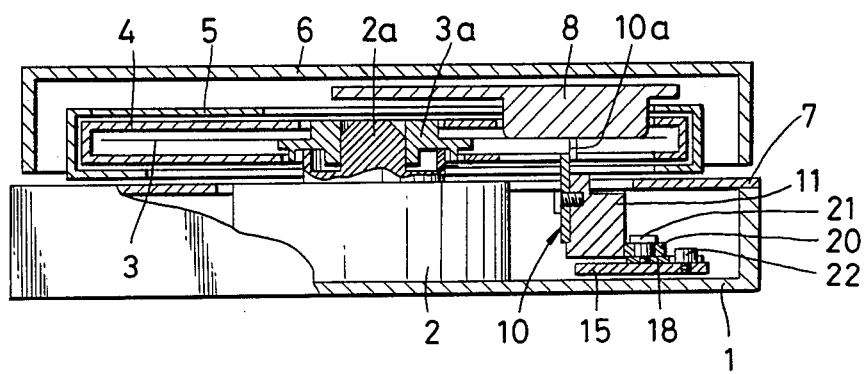
FIG. 3 is a cross-sectional view taken along line III—III of FIG. 1.

Referring to FIGS. 1 to 3, a disc rotating motor 2 is provided substantially centrally of a housing 1. A jacket 4 containing a magnetic recording disc 3 therein is supported parallel to the housing 1, and a center core 3a integral with the disc 3 is inserted into and supported by the driving shaft portion 2a of the motor 2 so that it is rotated at a predetermined speed. In order to enable the jacket 4 to be interchanged, a jacket holder 5 and a cover 6 covering the apparatus are provided so as to be pivotally movable about a shaft 5a by a supporting mechanism, not shown.

A base plate 7 covering a head feeding mechanism is provided in the upper portion of the housing 1, and a guide member 8 for controlling the position of the disc 3 is provided between the cover 6 and the disc 3. A magnetic head 10 including a head tip 10a is secured to a support member 11 by means of a small screw as shown in FIG. 3, and the contact between the disc 3 and the head 10 may be kept stable by the control of the guide member 8.

The support member 11 is fitted to a first guide shaft 12 and is supported so as to be capable of rectilinearly moving the head 10 in the radial direction (the direction of arrow D) toward the center of rotation of the disc 3. One end of the support member 11 is fitted to a second guide shaft 13, whereby the height of the head 10 is controlled. The support member 11 is biased upwardly by a spring 14, as viewed in FIG. 1.

A moving arm 15 has two arms 15a, 15b and an arcuate portion 15c formed at the end of the arm 15a, and is pivotally supported by a fixed shaft 17 studded in the housing 1, through a bearing 16 formed integrally therewith.

A support base plate 18 is secured substantially to the central portion of the arm 15a, and a shaft 21 for rotatably supporting a contact member 20 for bearing against the support member 11 and controlling the track position of the disc 3 is studded in the base plate 18. Further, the base plate 18 is provided with a cut-away groove 18a, and an eccentric pin 22 inserted in the cut-away groove 8a is studded in the base plate 18. The base plate 18 is adjusted by rotation of the eccentric pin 22, whereafter it is fixed to the arm 15.

The other arm 15b of the arm 15 is pulled by a spring 23, whereby any positional error of the contact member 20 attributable to the error of the fitting between the bearing 16 and the fixed shaft 17 is prevented.

Figure 4:
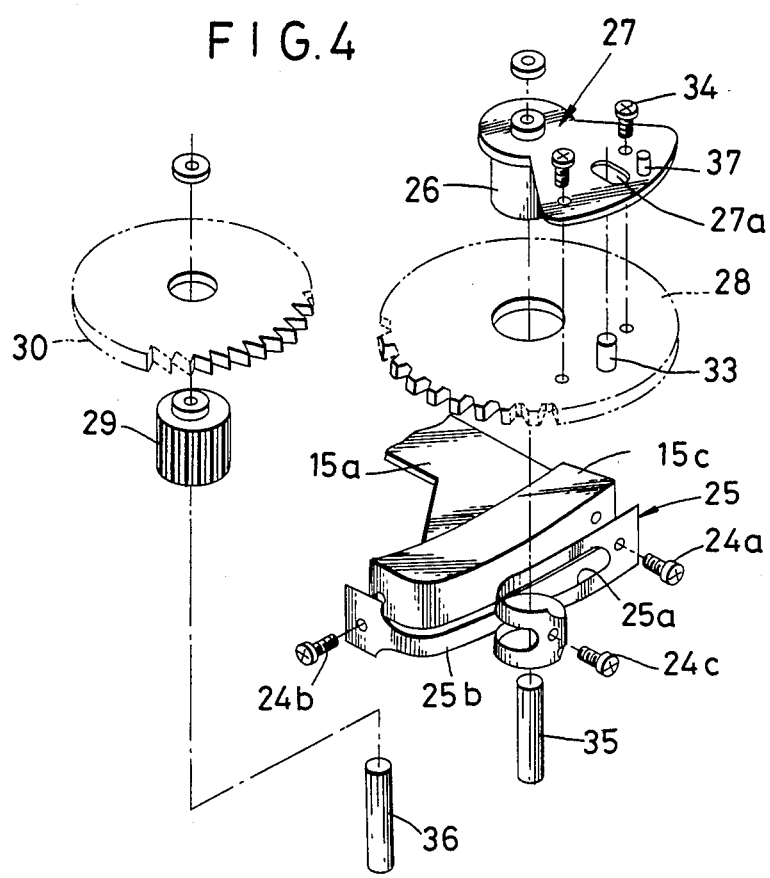
FIG. 4 is an exploded perspective view of the intermittent feeding mechanism of FIG. 1.

The housing 1 is provided with a feeding mechanism for automatically feeding the head 10. This feeding mechanism, as shown in FIGS. 1 and 4, is comprised of a thin metal belt 25 having its opposite ends fixed to the arcuate portion 15c of the arm 15 by small screws 24a and 24b, a pulley 26 on which the metal belt 25 is wound, a flange member 27 integrally secured to the pulley 26, a gear 28 provided displaceably relative to the flange member 27, a gear 29 meshing with the gear 28, a ratchet 30 formed coaxially and integrally with the gear 29, a feed pawl 31 engaged with the ratchet 30, and a reverse rotation preventing pawl 32 also engaged with the ratchet 30.

The metal belt 25 is formed into and a-shape with its narrow portion 25b inserted in a slot 25a formed in its wide portion, and the wound central portion thereof is fixed to the pulley 26 by a small screw 24c. The flange member 27 is provided with a slot 27a in which an eccentric pin 33 studded in the gear 28 fits, and the flange member 27 is fixed to the gear 28 by a small screws 34. Further, the pulley 26 is rotatably supported by a support shaft 35 studded in the housing 1, and the gear 29 is rotatably supported by a support shaft 36 also studded in the housing 1.

The flange member 27 further has a restraining pin 37 secured thereto and, as shown in FIG. 1, the tip end portion of a rotation limiting member 38 is inserted in the turn orbit of the restraining pin 37 so that the restraining pin 37 bears against the limiting member 38 when the gear 28 returns to its start position. This limiting member 38 is rotatively displaceable about a fixed shaft 39 relative to the housing and is fixed by a small screw 40.

The feed pawl 31 is rotatably supported on a shaft 42 studded at one end of a lever 41 and is biased clockwise by a spring 43. The lever 41 is pivotally supported on a shaft 44 and is biased clockwise by a spring 45. A pin 46 secured to the other end of the lever 41 bears against one end of a reciprocating link 48 supported for sliding movement to the left and right as viewed in FIG. 1 by two guide pins. A signal pin 49 is provided near the other end of the reciprocating link 48 so that the head feeding force in the direction of arrow E by an unshown driving mechanism, for example, a plunger magnet, operable by the head feeding signal from the body of the recording apparatus is transmitted to the other end of the reciprocating link 48. Also, the reverse rotation preventing pawl 32 is pivotally supported on a shaft 50 and is biased clockwise by a spring 51.

Operation of the above-described embodiment will now be described.

When a recording start button, not shown, (in the case of an electronic still camera, a shutter release button) is first depressed with the jacket 4 being mounted as shown in FIGS. 2 and 3, the motor 2 is driven and through the driving shaft portion 2a, the recording disc 3 starts to rotate. Still picture information based on an image signal obtained from an image pickup device or the like in response to a recording start signal (in the case of an electronic still camera, a shutter closing operation completion signal) produced in the magnetic recording apparatus is transmitted to the magnetic head 10 which is in contact with the underside of the disc 3, and is magnetically recorded so as to form an annular recording track at the outermost peripheral position of the disc 3 rotating at a predetermined high speed.

When the magnetic recording operation by one full rotation of the magnetic disc 3 is terminated, a head feeding signal is produced to prepare for the next recording operation, and a driving mechanism, not shown, for moving the signal pin 49 is operated to displace the signal pin 49 in the direction of arrow E. By the displacement of this signal pin 49, the lever 41 is pivotally moved counterclockwise. At the same time, the feed pawl 31 is displaced in the direction of arrow C in response to the lever 41. At this time, the spring 43 biases the feed pawl 31 clockwise so that the tip end pawl portion of the feed pawl 31 maintains its engagement with the toothed portion of the ratchet 30.

Accordingly, the feed pawl 31 rotates the ratchet 30 by an angle greater than a tooth (one pitch) and smaller than two teeth (two pitches). Thereafter, when the driving mechanism is further operated, the signal pin 49 moves in the direction opposite to the direction of arrow E and returns to its position shown in FIG. 1. Following the return operation of the signal pin 49, the reciprocating link 48 returns in the direction opposite to the direction of arrow E with the aid of the biasing force of the spring 45, and the feed pawl 31 also returns. At that time, the ratchet 30 is prevented from rotating counter-clockwise by the pawl 32.

The biasing force of the spring 14 pulling the support member 11 acts through the contact member 20 so as to rotate the arm 15 counter-clockwise, and is transmitted through the metal belt 25, the pulley 26, the gear 28 and the gear 29 in succession and acts as a force which rotates the ratchet 30 counter-clockwise. Therefore, the operation of rotating the ratchet 30 by the feed pawl 31 is performed against the biasing force of the spring 14.

Thereafter, when the feed pawl 31 returns as previously described, the ratchet 30 is slightly rotated counter-clockwise by the biasing force of the spring 14, but that rotation is prevented by the pawl 32 and the ratchet stops at a position whereat it has been fed just by an amount corresponding to one ratchet tooth. Further, the feed pawl 31 still moves in the direction opposite to the direction of arrow C even after the ratchet 30 has been prevented from rotating in the reverse direction, and stops with the reciprocating link 48 at a position whereat the tip end pawl portion of the feed pawl 31 drops into an adjacent valley portion beyond the top of the ratchet tooth.

In the above-described manner, one reciprocal movement of the reciprocating link 48 which slides in response to the feeding operation (reciprocal movement)

of the signal pin 49 is completed, whereby the operation of the feeding mechanism of the magnetic head is performed for one cycle of recording operation to be described hereinafter (in the case of an electronic still camera, the operation of photographing a picture plane). That is, when the ratchet 30 rotates by an amount corresponding to one ratchet tooth, the gear 29 integral with the ratchet 30 rotates by a corresponding angle and rotates the gear 28 meshing with the gear 29 at a reduced speed by a slight angle in accordance with the ratio of the numbers of teeth of the two gears. Accordingly, the pulley 26 rotatable with the gear 28 is rotated by an amount corresponding to one cycle of head feeding. In this case, the feed angle of the pulley 26 is an equal angle intermittent rotative feed because the ratchet 30 has its pitch formed constantly.

Figure 5:
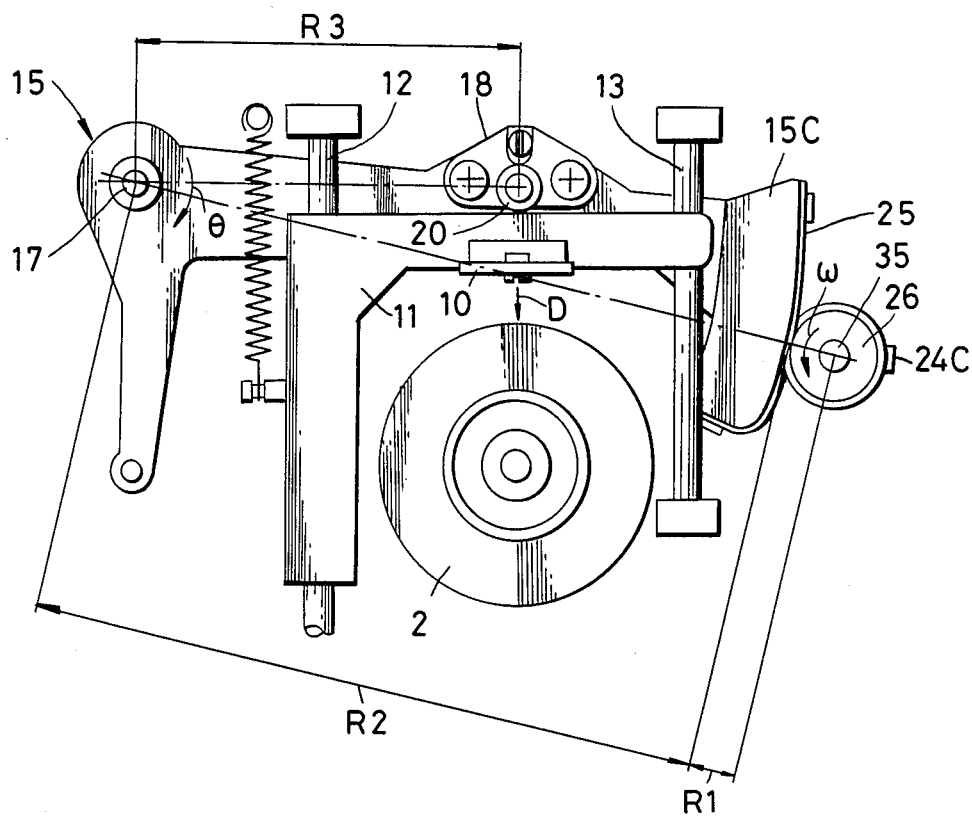
FIG. 5 is a plan view of a head feeding mechanism.

The essential portions of the head feeding mechanism are shown in FIG. 5. Rotation of the pulley 26 is transmitted to the arm 15 through the metal belt 25. The pulley 26 is a cylinder member of a radius $R_1$ having the shaft 35 as the center of rotation, and the arcuate portion 15c of the arm 15 has an arcuate surface of a radius $R_2$ having the fixed shaft 17 as the center of rotation, and the metal belt 25 intervenes in the slight gap between the pulley 26 and the arm 15. Accordingly, the angle of rotation $\omega$ of the pulley 26 is reduced at a ratio of $R_1/R_2$ and transmitted as the angle of rotation $\theta$ of the arm 15. Also, each clockwise rotation of the arm 15 by a predetermined angle is converted into movement corresponding to one cycle of recording (e.g. one track pitch) of the head 10 in the direction of arrow D (the direction toward the center of rotation of the disc) by pressing and moving the support member 11 through the contact member 20 lying at a position of a radius $R_3$ from the fixed shaft 17.

A method of highly accurately positioning the head 10 will now be described in detail.

Figure 6:
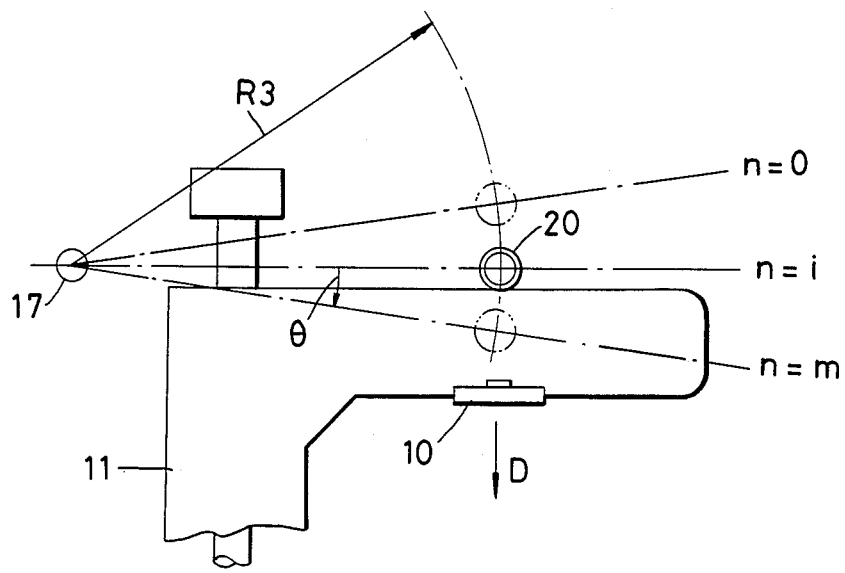
FIG. 6 schematically illustrates the principle of the magnetic head feeding of the present invention.

Since movement of the support member 11 is controlled by the guide shaft 12, the amount of movement of the support member 11 caused by pivotal movement of the arm 15 is equal to the amount of movement of the contact member 20 in the direction of arrow D. As shown in FIG. 6, the rotative displacement of the contact member 20 which effects equal angle intermittent rotative movement at a rotation radius $R_3$ about the fixed shaft 17 is converted into a very accurate approximately equal interval rectilinear movement of the support member 11. In this case, in order that the approximate error may be small in converting the rotative displacement of the arm 15 into the rectilinear displacement of the head 10, the line passing through the fixed shaft 17 and the contact member 20, and more accurately, the line passing through the point of contact between the contact member 20 and the support member 11 and through the center of curvature of the pivotal movement path of said point of contact is made perpendicular to the direction of movement of the head at the ith ($i \approx m/2$) track position corresponding to the substantially intermediate one of all recording tracks from the outermost peripheral (0th) track to the innermost peripheral (mth) track. At that time, the component y of the amount of movement of the contact member 20 in the direction of arrow D from the ith track position is expressed by the following equation:

$$y = R_3 \sin(n-i)\theta_0; (n=0, 1, 2, \ldots, m) \qquad (1),$$

where in the amount of movement y of the head, the movement toward the inner periphery of the disc is positive and the movement toward the outer periphery of the disc is negative and $\theta_0$ is the angle of rotation of the arm 15 per track.

On the other hand, the amount of movement Y of the head from the ith track when the head 10 is rectilinearly moved at an equal interval pitch is expressed by $$Y = (n-i)Y_0; (n=0, 1, 2, \ldots, m), \qquad (2),$$

where $Y_0$ is the pitch between adjacent tracks, and in the amount of movement Y of the head, the movement toward the inner periphery of the disc is positive and the movement toward the outer periphery is negative, as in equation (1).

Accordingly, the amount of deviation $y - Y$ of the track position from the equal interval pitch rectilinear feeding caused when the feeding of the magnetic head is effected by the equal angle rotation of the arm as shown in FIG. 6 is given as follows by equations (1) and (2):

$$y - Y = R_3 \sin(n-i)\theta_0 - (n-i)Y_0 \qquad (3)$$

Assuming that the clockwise rotation angle $\theta_0$ of the arm 15 per track corresponds to the angle of rotation $\theta_0$ of the pulley 26 per ratchet tooth of the ratchet 30, the rotation angle $\theta_0$ is expressed by $$\theta_0 = (R_1/R_2) \cdot \omega_0 \qquad (4).$$

So, when the radius $R_1$ of the pulley 26, the radius $R_2$ of the arcuate portion 15c of the arm 15 and the intended head feed pitch $Y_0$ are set, the amount of deviation $(y-Y)$ of the head feed position expressed by equation (3) is determined by the manner in which the value of the rotation radius $R_3$ of the contact member 20 is chosen.

If the rotation angle $\theta_0$ of the arm 15 per track expressed by equation (4) can be chosen to a very small value and $\sin(n-i)\theta_0$ becomes a value sufficiently approximate to $(n-i)\theta_0$, the amount of deviation $(y-Y)$ of the track position expressed by equation (3) will become small by determining $R_3$ so that $R_3 = Y_0/\theta_0$.

Actually, however, when the size of the device and the working accuracy of the components are taken into account, there is a limit in making the ratio of $R_1/R_2$ small and it may be said to be particularly unsuitable for a case where high head positioning accuracy is required as in an electronic still camera. Accordingly, the amount of deviation $(y-Y)$ of the track position is set so as to be zero at the central position $(i=m/2)$ of the total number of tracks m, and the value of $R_3$ is determined so as to minimize the maximum value of the amount of positional deviation (absolute value) of each track in the whole track range.

Figure 7:
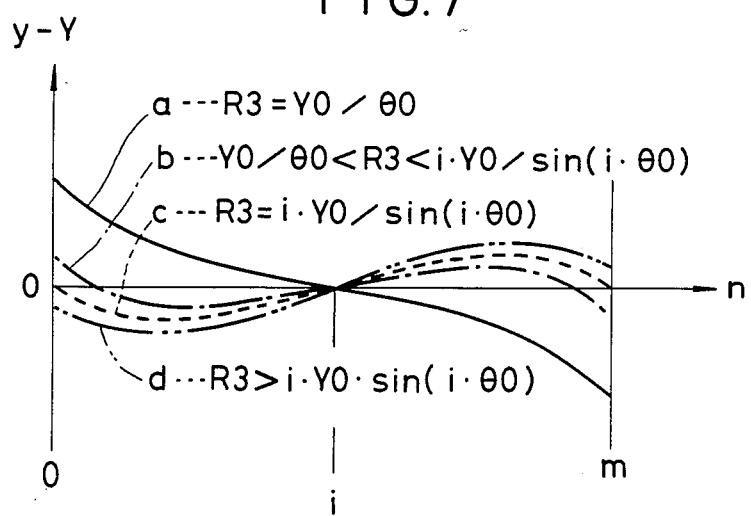
FIG. 7 is a graph showing the approximate error of the magnetic head feeding of FIG. 6.

FIG. 7 shows the amount of deviation $(y-Y)$ of the track position when the maximum value of the amount of positional deviation (absolute value) of each track is minimized in the whole track range. In FIG. 7, the distance $R_3$ from the center of rotation of the arm 15 to the contact member 20 set so that the amount of deviation $(y-Y)$ of the track position is smaller than when $R_3$ is set to $R_3 = Y_0/\theta_0$ (indicated by solid line a in FIG. 7) is indicated by curves b, c and d. The curves b, c and d indicate $R_3$ set under the following conditions:

b ... $(Y_0/\theta_0) < R_3 < i \cdot Y_0/\sin(i \cdot \theta_0)$ c ... $R_3 = i \cdot Y_0/\sin(i \cdot \theta_0)$ d ... $R_3 > i \cdot Y_0 \sin(i \cdot \theta_0)$ where $i = m/2$.

That is, the value of $R_3$ may be made greater than $Y_0/\theta_0$, whereby the value of $R_3$ may be set so that the maximum value of the amount of deviation is smaller than in the case of the curve a in such a manner that as the magnetic head 10 shifts from the ith track to the inner peripheral side or the outer peripheral side, the absolute value of the amount of deviation (y−Y) of the track position increases, whereafter as the head approaches the innermost or outermost peripheral track, said amount of deviation decreases or the sign of positive or negative is reversed.

As a result, assuming that, for example, the ratio of $R_3$ to the total amount of feed Ymax of the head is $R_3/Y\max \approx 6$, the maximum value of the absolute value of the amount of deviation (y−Y) of the track position in the whole track range is about ⅓ as compared with the case of the curve c ($R_3 = i \cdot Y_0/\sin(i \cdot \theta_0)$) and the case of the curve a ($R_3 = Y_0/\theta_0$). To minimize the maximum value of the absolute value of the amount of deviation (y−Y) of the track position in the whole track range by this system, $R_3$ may be set so that as indicated by the form of the curve b, there is a point at which the values of the amount of deviation (y−Y) at the outermost and innermost peripheral track positions are zero between these track positions and the ith track and the sign is reversed and the maximum absolute values are substantially equal with this zero position as the boundary.

This can be achieved by making $R_3$ slightly smaller than $R_3 = iY_0/\sin(i \cdot \theta_0)$.

In this case, however, the absolute value of the amount of deviation (y−Y) of the track position tends to abruptly increase in the vicinity of the outermost periphery (n=0) and the innermost periphery (n=m). Therefore, unless the design is such that the error is just zero at the i(=m/2) the track, there is an undesirable possibility that the absolute value of the amount of deviation (y−Y) of the track position becomes greater than in the cases of the curves c and d. Therefore, in the actual manufacture, the possibility of increase in the error by the deviation of the setting of each component is smaller if $R_3$ is rendered into $R_3 \approx (m/2) \cdot Y_0/\sin(m \cdot \theta_0/2)$ and the curve c in which the amount of deviation (y-Y) of the track position on the innermost periphery and the outermost periphery also is zero is set or a value slightly greater than that is rendered into the set value of $R_3$, and this is more practical.

For the adjustment of the distance $R_3$ from the center of rotation of the arm 15 to the contact member 20, the two small screws fixing the base plate 18 may be slightly loosened, whereafter the eccentric pin 22 may be rotated to finely move the contact member 20 to the left or right as viewed in FIG. 5 with the base plate 18 and the distance $R_3$ may be adjusted, whereafter the small screws may be again tightened. Highly accurate positioning of the magnetic head 10 is possible by such adjustment of the position of the contact member 20.

If an unshown recording start button (in the case of an electronic still camera, a shutter release button) is operated after the first recording operation (photographing operation) has been terminated, the second and subsequent cycles of magnetic recording and movement of the magnetic head (changeover of the recording track) are repetitively effected in the same manner as the previously described first cycle. When the necessity of returning the magnetic head to the start position, such as the interchange of the jacket 4, has occurred, both pawls 31 and 32 may be disengaged from the ratchet teeth by a mechanism, not shown. When both pawls 31 and 32 become disengaged from the ratchet teeth, the gear 28 rotates clockwise with the aid of the biasing force of the spring 14 until the restraining pin 37 bears against the tip end portion of the limiting member 38, and at the same time, the head 10 follows the arm 15 pivotally moved through the metal belt 25 and returns to the start position.

While the head feeding device of a magnetic recording apparatus has been shown in the abovedescribed embodiment, the present invention is also applicable to a reproducing apparatus.

What we claim is:

1. An apparatus for recording information on concentric circular recording tracks on a rotatable magnetic recording medium and/or reproducing the information from said recording tracks, comprising:
   a magnetic head provided in opposed relationship with said recording medium;
   a rotatable member;
   driving means for intermittently rotating said rotatable member by a predetermined angle;
   pivoting means having a pivot axis and intermittently pivoting in a predetermined direction about said pivot axis by a unit pivot angle corresponding to said predetermined angle in response to said rotatable member; and
   means for intermittently moving said magnetic head in one direction on a straight line passing through the center of rotation of said recording medium in response to said pivoting means, said moving means including a support member holding said magnetic head and movable in a rectilinear direction and coupling means for point-coupling said pivoting means and said support member at a contact position spaced apart from said pivot axis by a predetermined distance to convert the pivotal displacement of said pivoting means into rectilinear displacement of said support member, said coupling means being provided so that when said magnetic head is opposed to a substantially central one of said concentric circular recording tracks, a segment passing through said contact position and the center of curvature of the path of said contact position while said pivoting means pivots is orthogonal to the direction in which said support member moves.

2. An apparatus according to claim 1, wherein said driving means intermittently rotates said rotatable member in one direction.

3. An apparatus according to claim 1, wherein m of said recording tracks are arranged in the form of concentric circles at a predetermined pitch $Y_0$ and, when said unit pivot angle of said pivoting means is $\theta_0$, said coupling means is provided so that the distance from said center of curvature to said contact position is substantially equal to $i \cdot Y_0/\sin(i \cdot \theta_0)$, where $i = m/2$.

4. An apparatus according to claim 1, wherein m of said recording tracks are arranged in the form of concentric circles at a predetermined pitch $Y_0$ and, when said unit pivot angle of said pivoting means is $\theta_0$, said coupling means is provided so that the distance R from said center of curvature to said contact position is $Y_0/\theta_0 < R < i \cdot Y_0/\sin(i \cdot \theta_0)$, where $i = m/2$.

5. An apparatus according to claim 1, further comprising means includes means for adjusting said coupling means to vary said predetermined distance between said pivot axis and said contact position.

6. An apparatus for recording information on a circular recording area on a rotatable recording medium and/or reproducing the information from said recording area, comprising:
- a head member provided in opposed relationship with said recording medium;
- pivoting means having a pivot axis and pivoting about said pivot axis;
- driving means for pivoting said pivoting means;
- a support member holding said head member and movable in a rectilinear direction on a straight line passing through the center of rotation of said recording medium; and
- means for coupling said pivoting means and said support member at a contact position spaced apart from said pivot axis by a predetermined distance, said coupling means converting the pivotal displacement of said pivoting means into rectilinear displacement of said support member, and said coupling means being provided so that when said head member is opposed to a substantially intermediate position between outermost and innermost peripheral positions of said circular recording area, a segment passing through said contact position and the center of curvature of a path of movement of said contact position is orthogonal to said straight line.

7. An apparatus according to claim 6, wherein said coupling means is provided so that said segment is orthogonal to said straight line when said head member is opposed to a central position between outermost and innermost peripheral positions of said circular recording area.

8. An apparatus according to claim 6, wherein said coupling means is provided so that said segment is orthogonal to said straight line when said head member is opposed to near a central position between outermost and innermost peripheral positions of said circular recording area.

9. An apparatus according to claim 6, wherein said recording medium has concentric circular recording tracks and said driving means pivots said pivoting means by a unit pivot angle intermittently.

10. An apparatus according to claim 9, wherein m of said recording tracks are arranged in the form of concentric circles at a predetermined pitch $Y_0$ and, when said unit pivot angle of said pivoting means is $\theta_0$, said coupling means is provided so that the distance R from said center of curvature to said contact position is $Y_0/\theta_0 < R < i \cdot Y_0/\sin(i \cdot \theta_0)$, where $i = m/2$.

11. An apparatus according to claim 6, wherein said coupling means is provided so that the distance from said center of curvature to said contact position is substantially equal to half of the distance between said outermost and said innermost peripheral positions divided by a sine of half of a pivot angle of said pivoting means required to displace said head member between positions of said head member opposed to said outermost and innermost peripheral positions of said circular recording area.

12. An apparatus for recording information on a circular recording are on a rotatable recording medium and/or reproducing the information from said recording area, comprising:
- a head member provided in opposed relationship with said recording medium;
- pivoting means having a pivot axis and a contact member spaced apart from said pivot axis by a predetermined distance, and pivoting about said pivot axis;
- driving means for pivoting said pivoting means;
- a support member holding said head member and movable in a rectilinear direction on a straight line passing through the center of rotation of said recording medium, and having a flat surface intersecting at a substantially right angle to said straight line; and
- means for coupling said contact member of said pivoting means and said flat surface of said support member to convert the pivotal displacement of said pivoting means into rectilinear displacement of said support member, said coupling means being provided so that said contact member slides on said flat surface during said pivotal displacement of said pivoting means.

13. An apparatus according to claim 12, wherein said contact member includes a rotatable member rotatably supported on said pivoting means.

14. An apparatus according to claim 12, wherein said coupling means includes means for biasing said flat surface of said support member in a direction toward said contact member.

15. An apparatus according to claim 12, wherein said recording medium has concentric circular recording tracks and said driving means pivots said pivoting means by a unit pivot angle intermittently.

* * * * *